United States Patent [19]

Fevrier et al.

[11] Patent Number: 5,612,805
[45] Date of Patent: Mar. 18, 1997

[54] ADD-DROP OPTICAL SPECTRUM-DIVISION MULTIPLEXER

[75] Inventors: Hervé Fevrier, Verrieres le Buisson; Philippe Perrier, Velizy-Villacoublay; Luc Berthelon, Palaiseau, all of France

[73] Assignee: Alcatel Cit, Paris, France

[21] Appl. No.: 460,562

[22] Filed: Jun. 2, 1995

[30] Foreign Application Priority Data

Jun. 7, 1994 [FR] France .................................. 94 06984

[51] Int. Cl.$^6$ ........................................... H04J 14/02
[52] U.S. Cl. ..................... 359/124; 359/127; 359/128
[58] Field of Search .................................... 359/115, 124, 359/125, 127, 128, 114

[56] References Cited

U.S. PATENT DOCUMENTS

| 5,438,445 | 8/1995 | Nakano | 359/127 |
| 5,479,082 | 12/1995 | Calvani et al. | 359/125 |
| 5,488,500 | 1/1996 | Glance | 359/128 |

FOREIGN PATENT DOCUMENTS

0488241A2  6/1992  European Pat. Off.

OTHER PUBLICATIONS

*Proceedings IEEE Conference on Computer Communications Infocomm '93.*, vol. 2, 28 Mar. 1993, pp. 578–585; Kuon-Chun Lee et al, "Routing and Switching in a Wavelength Convertible Optical Network".

*Transactions of the Institute of Electronics and Communication Engineers of Japan, Section E,* No. 1, Jan. 1991, Tokyo, JP, pp. 84–91; Minoru Akiyama et al, "Photonic Switching System".

*Journal of Lightwave Technology,* vol. 11, No. 5, May 1993, New York US, pp. 714–732, Stephen B. Alexander et al, "A precompetitive consortium on wide-band all-optical networks".

*Primary Examiner*—Leo Boudreau
*Assistant Examiner*—Bhavesh Mehta
*Attorney, Agent, or Firm*—Sughrue, Mion, Zinn, Macpeak & Seas

[57] ABSTRACT

An add-drop optical spectrum-division multiplexer for dropping a drop multiplex from an incoming multiplex signal and for adding an add multiplex into an outgoing multiplex signal. The multiplexer includes a demultiplexing device for separating a number of optical carriers from the incoming multiplex signal and for selecting drop carriers which constitute the drop multiplex as well as through carriers which are to be output as the outgoing multiplex signal. The multiplexer further includes an apparatus for selecting a certain number of add carriers from the total number of carriers of the add multiplex, and a coupling device and wavelength converter for allocating fixed wavelengths to the signals which modulate the through carriers and the add carriers.

10 Claims, 5 Drawing Sheets

ADD-DROP OPTICAL SPECTRUM-DIVISION MULTIPLEXER

The invention relates to add-drop spectrum-division multiplexer for dropping a "drop" multiplex and for adding an "add" multiplex to an optical multiplex comprising a plurality of optical carriers that are spectrally multiplexed. Each optical carrier is modulated by a modulating signal which may be the result of a time-division multiplex of a plurality of channels. Such a multiplexer is suitable for use, in particular, in optical transmission networks in a synchronous digital hierarchy.

The article: "Arrayed-waveguide grating add-drop multiplexer with loopback optical path" published in Electronic Letters, Nov. 25, 1993, Vol. 29, No. 24, p. 2133, describes an add-drop spectrum-division multiplexer including a component called an arrayed-waveguide grating which is functionally equivalent to a spectrum-divided demultiplexer having one inlet and N outlets to separate N optical carriers having N respective different wavelengths; and a spectrum-division multiplexer having N inlets and one outlet to spectrally multiplex N optical carriers having N distinct wavelengths that are respectively equal to the preceding wavelengths.

FIG. 1 is a block diagram of an add-drop spectrum-division multiplexer implemented by means of that component. An incoming multiplex ME is applied to the inlet of a demultiplexer DS1. An outgoing multiplex MS is delivered by the outlet of a multiplexer MS1. The N outlets of the demultiplexer DS1 are connected to N optical fiber segments, each having one end fitted with a respective connector C1, . . . , CN. The N inlets to the multiplexer MS1 are connected to N respective optical fiber segments, each having one end being provided with a respective connector C'1, . . . , C'N.

These connectors constitute means for manually selecting S outlets from amongst the N outlets of the demultiplexer DS1; and for supplying the multiplexer MS1 with P optical carriers to be added to the outgoing multiplex MS. The carriers to be added have P respective distinct wavelengths selected from the S wavelengths corresponding to the S selected outlets, where the number P of carriers to be added is not greater than the number S. For example, by manually disconnecting the connectors Ci and C'i, it is possible to drop a carrier of wavelength $\lambda_i$ as delivered by the connector Ci, and to add another carrier of wavelength $\lambda_i$ modulated by other data and applied to the connector C'i.

To pass through the carriers that are not dropped, it suffices to leave the corresponding connectors connected together. For example, if the carrier of wavelength $\lambda_i$ is not to be dropped, then it suffices to leave the corresponding connectors C1 and C'1 connected together.

That known device presents the advantage of being very simple, but it suffers from a serious drawback: the wavelengths of the outgoing multiplex MS, the wavelengths corresponding to the S selected outlets, the wavelengths of the carriers to be added, and the wavelengths of the incoming multiplex ME are not independent. In particular:

each of the non-drop carriers conserves its respective wavelength; and the added carriers are necessarily of wavelengths that are respectively identical to the wavelengths corresponding to the S selected outlets because the principle on which an arrayed-waveguide grating operates determines a predetermined wavelength for each of the inlets to the grating.

This drawback is particularly troublesome when making a high data rate telecommunications network constituted by lengths of optical fiber between which add-drop multiplexers are inserted. Protecting such a network against line or multiplexer failures, and adapting the network to variations in traffic both make it necessary to be able to reconfigure the network quickly. The scope for reconfiguration is very limited when it is not possible to reallocate wavelengths to the modulating signals in order to alter the routing of said signals, where routing is a function of the wavelength carrying each signal.

Also, that known multiplexer is unsuitable for broadcasting the same data to a plurality of destinations in a network since it does not allow for the same carrier to be transmitted simultaneously to the outgoing multiplex and to a drop multiplex. Finally, it does not enable one or more carriers of the add multiplex to be looped back to the drop multiplex.

The object of the invention is to provide an add-drop multiplexer that does not suffer from the drawbacks of that known multiplexer.

The invention provides an add-drop optical spectrum-division multiplexer for dropping a "drop" multiplex from a "incoming" multiplex, and for adding a "add" multiplex to an "outgoing" multiplex, the multiplexer comprising:

spectrum-division demultiplexing means suitable for separating N carriers from the incoming multiplex, said incoming multiplex having no more than N carriers;

spectrum-division multiplexing means suitable for multiplexing N carriers, thereby constituting an "outgoing" multiplex; and coupling means for coupling the demultiplexing means to the multiplexing means;

characterized in that the spectrum-division demultiplexing means and the coupling means comprise:

an optical broadcaster receiving the incoming multiplex and reproducing it on at least N outlets;

at least N tunable filters coupled respectively to the N outlets of the broadcaster to select T "through" carriers from the incoming multiplex, where the number T is variable and not greater than N;

selection means for selecting, amongst no more than N demultiplexed carriers, E "drop" carriers and constituting the drop multiplex, the number E being variable and not greater than N;

selection means for selecting, from amongst the carriers constituting the add multiplex, I "add" carriers, the number I being variable and not greater than N;

means for supplying the multiplexing means with T new carriers having T respective different wavelengths selectable from N fixed wavelengths, and being respectively modulated by the signals modulating the T through carriers; and means for supplying the multiplexing means with I new optical carriers having I respective different wavelengths selectable from the N fixed wavelengths and different from the T wavelengths selected for the signals modulating the T through carriers; said I new wavelength being modulated by the signals modulating the I add carriers.

The multiplexer characterized in this way makes it possible: to select the wavelengths of the carriers in the incoming multiplex independently from the wavelengths in the outgoing multiplex, because of the means for providing T new carriers; to select the wavelengths of the add multiplex independently from the wavelengths of the outgoing multiplex, because of the means for providing I new carriers; and to select the add multiplex wavelengths independently of the incoming multiplex wavelengths, because of the means for providing I new carriers. It thus provides the advantage of enabling the network to be reconfigured without restriction.

In a particular embodiment, a multiplexer according to claim 1 is characterized in that the means for selecting E drop carriers comprise means enabling each of the carriers of the incoming multiplex to be directed simultaneously to the drop multiplex and to the means for providing T new optical carriers.

The multiplexer characterized in this way makes it possible to broadcast the same data to a plurality of destinations since the means for selecting E drop carriers and T transmitted carriers include means enabling a carrier to be switched both to the drop multiplex and to the means for providing T carriers to the multiplexing means.

In a preferred embodiment, the multiplexer of the invention is characterized in that it further includes switch means enabling any carrier in the add multiplex to be selected and passed through to said outgoing multiplex.

The multiplexer characterized in this way presents the advantage of enabling the add multiplex to be looped back to the drop multiplex, at least for certain selected wavelengths to route local calls which are not conveyed by the outgoing multiplex.

The invention will be better understood and other characteristics will appear on reading the following description and the accompanying figures.

Figure 3:
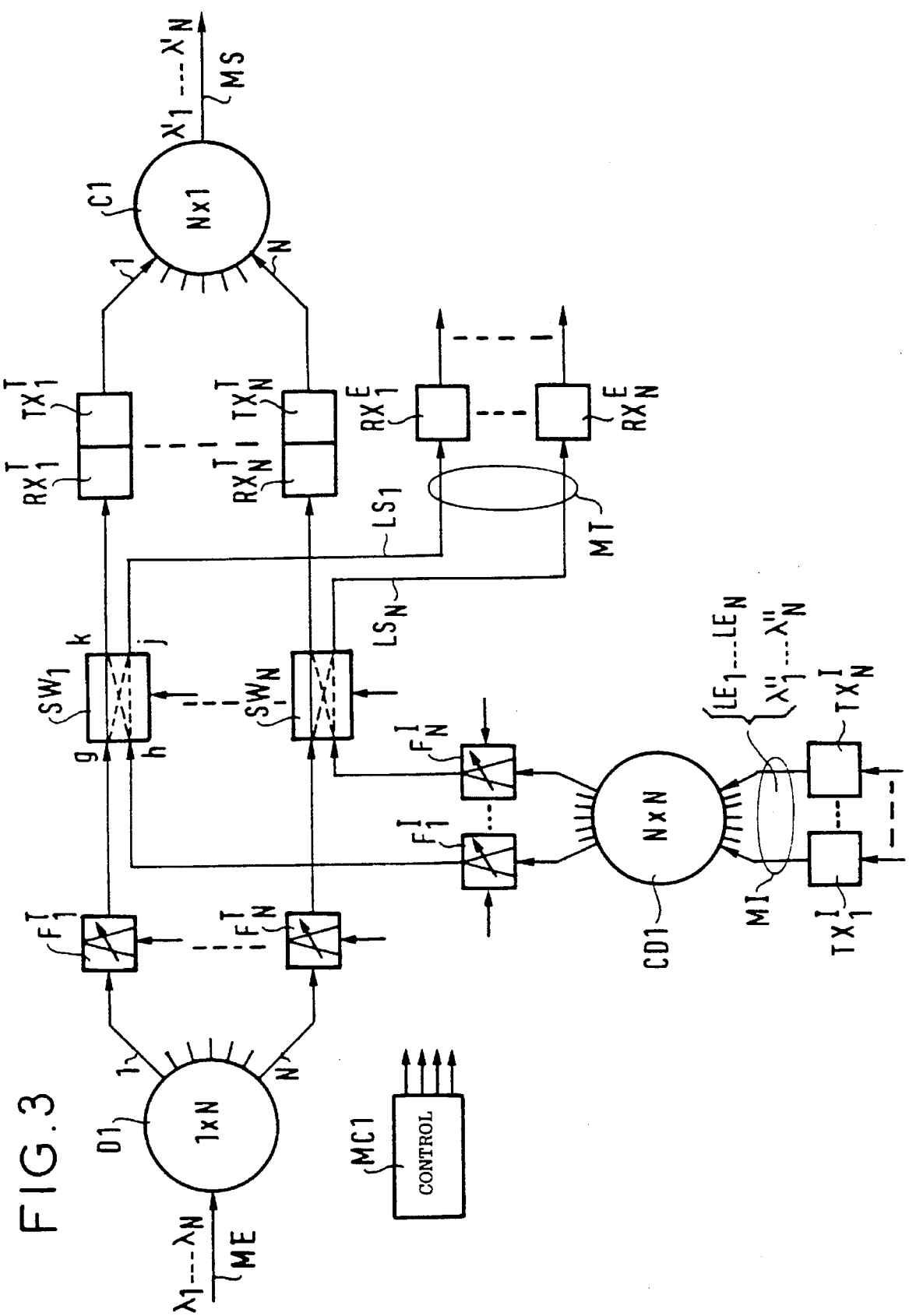
Figure 4:
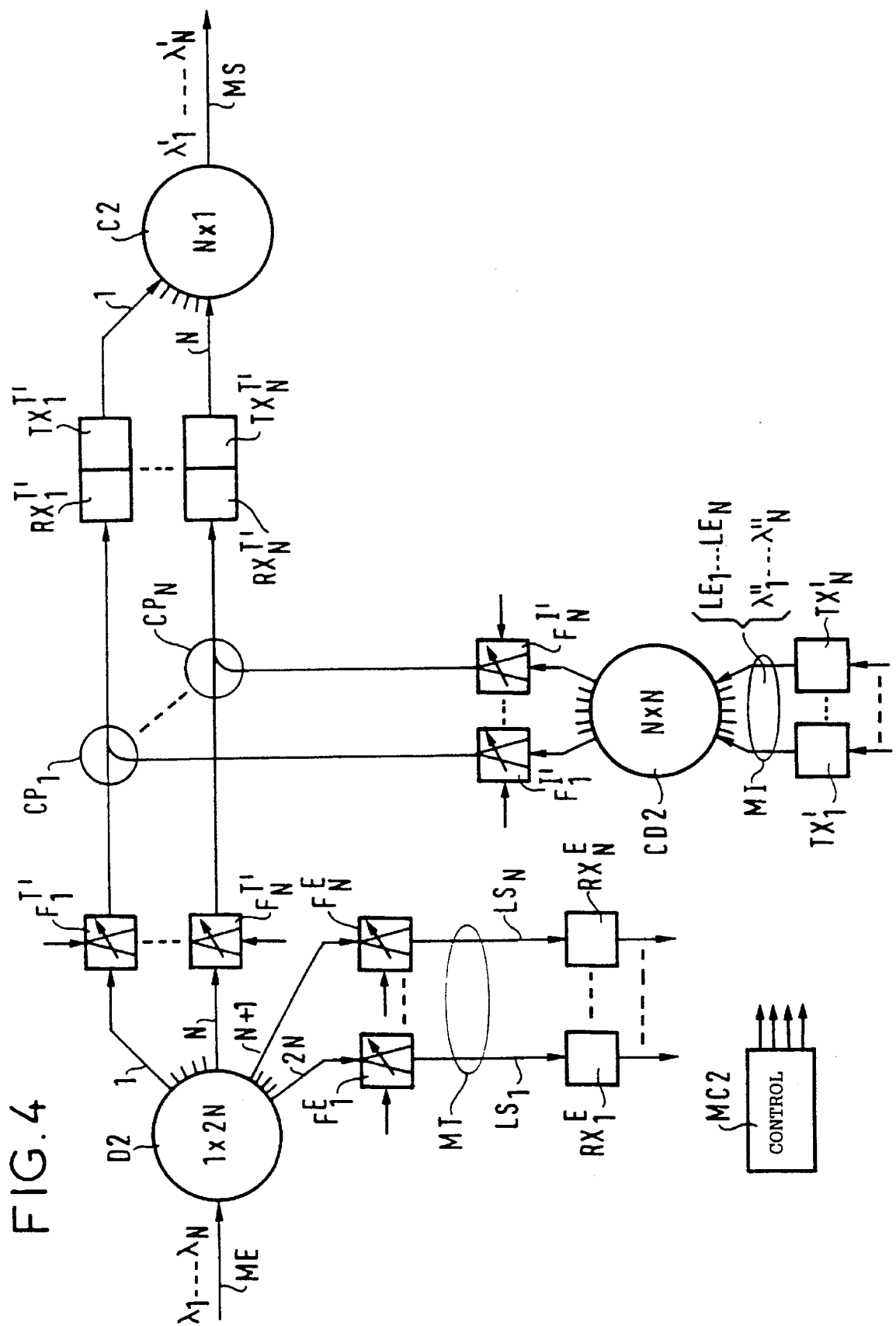
Figure 5:
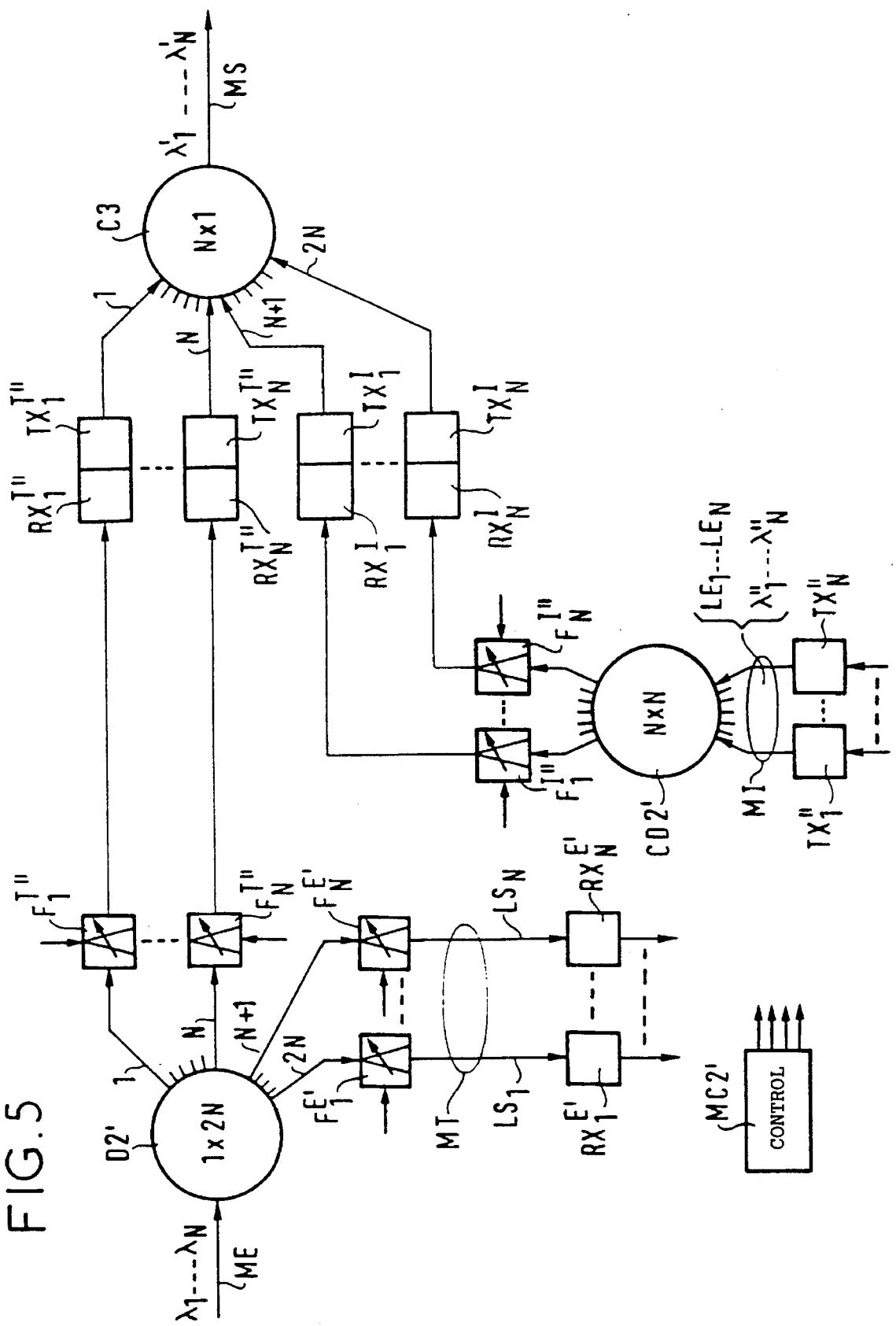
Figure 6:
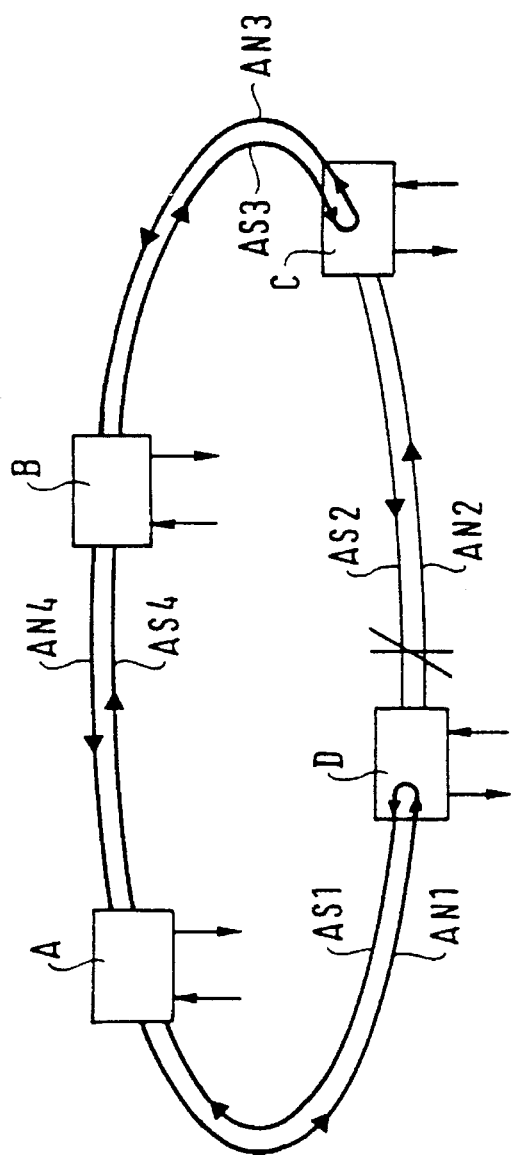
Figure 7:
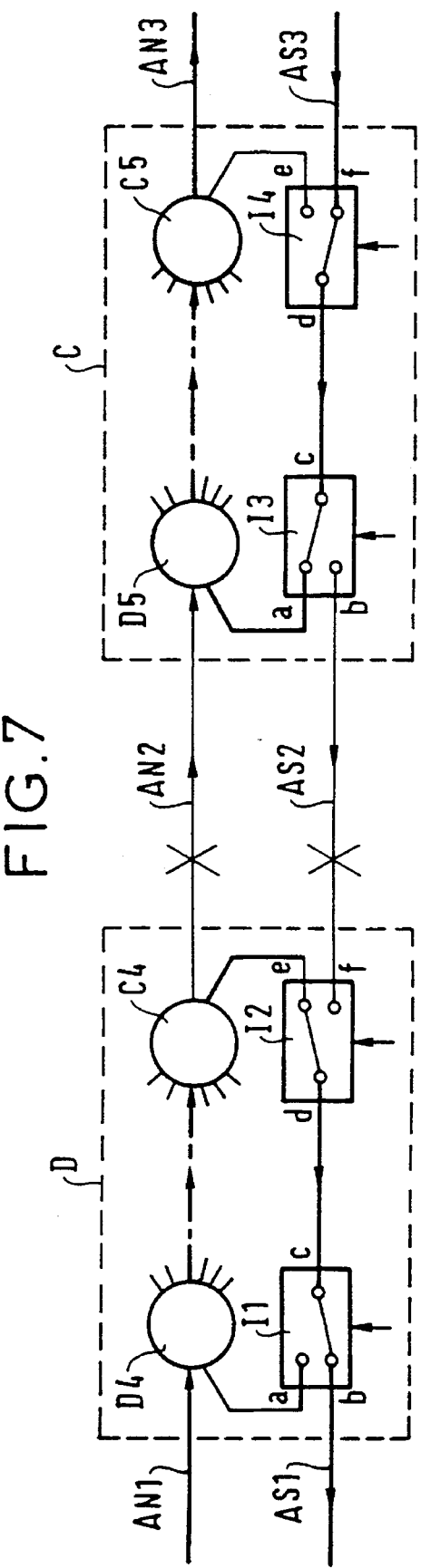

FIGS. 3, 4, and 5 are block diagrams of three respective embodiments of the multiplexer of the invention;

FIG. 6 is a block diagram of a ring network including add-drop multiplexers; and FIG. 7 is a block diagram of means for adding a multiplexer of the invention to provide security in a ring network of the kind shown in FIG. 6, and it illustrates the procedure for reconfiguring the ring in the event of a link failure.

Figure 1:
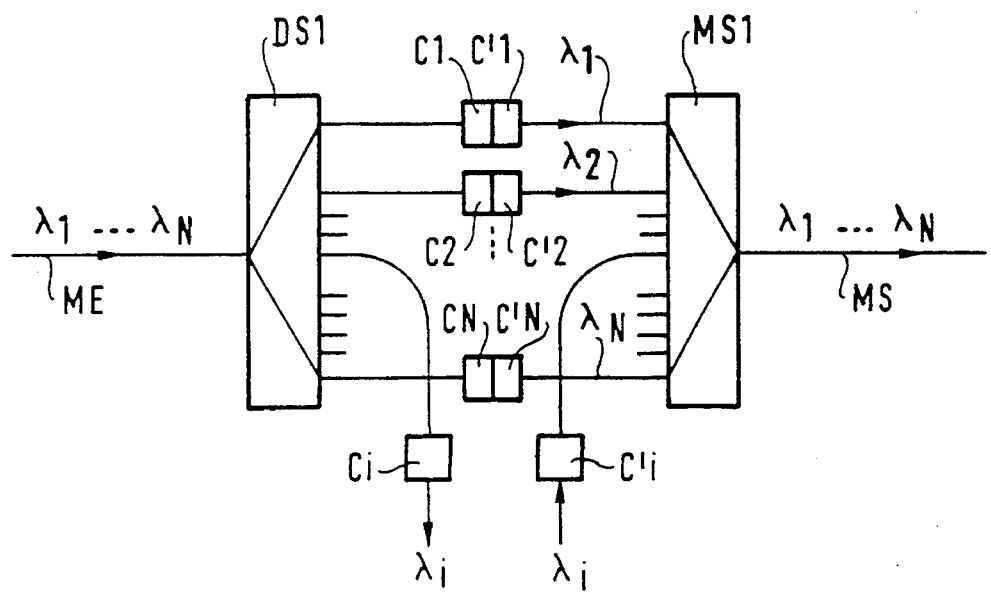
FIG. 1 is a block diagram of the known multiplexer described above.
Figure 2:
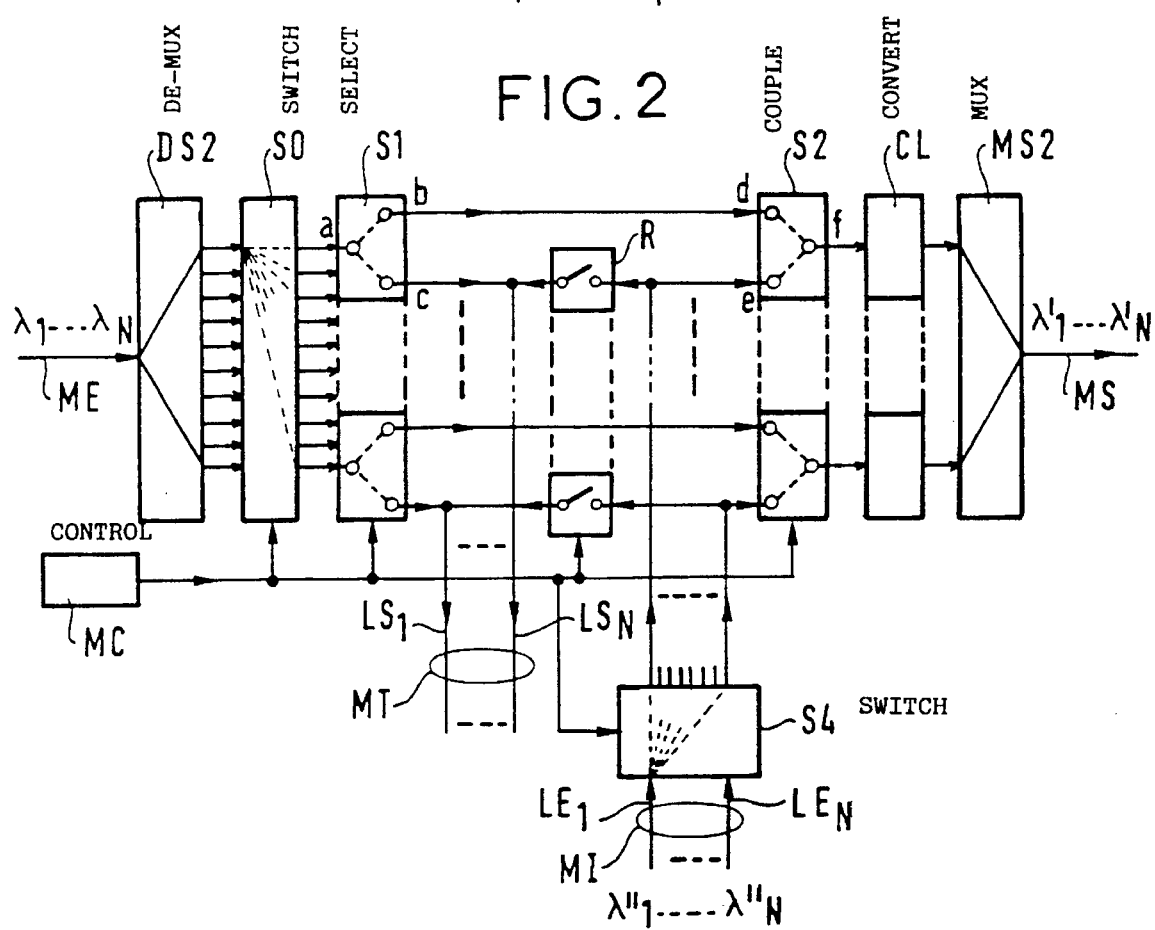
FIG. 2 is a block diagram of a multiplexer of the invention.

As can be seen in FIG. 2, the functional structure of a multiplexer of the invention comprises:

control means MC receiving instructions for configuring the multiplexer by some conventional signalling method;

means DS2 for spectrally demultiplexing an "incoming" optical multiplex ME; said means including N outlets respectively providing the N carriers making up the incoming multiplex ME, said carriers having respective different wavelengths $\lambda_1, \ldots, \lambda_N$;

switch means S0 controlled by the control means MC, having N inlets connected to respective ones of the N outlets of the means DS2, and including N outlets, each outlet being connected to only one inlet;

selection means S1 controlled by the control means MC and equivalent to N switches each having one input a and two outlets b and c, each inlet a being connected to a respective one of the outlets of the switch means S0; the means S1 selecting E "drop" carriers and T "through" carriers from the N carriers demultiplexed by the multiplexer DS2 and passed through via the switch means S0; each of E and T is no greater than N;

N optical links $LS_1, \ldots, LS_N$ connected respectively to the N c outlets of the means S1 and each constituting a drop multiplex MT; these links conveying the E drop carriers which conserve their respective wavelengths having values in the range $\lambda_1, \ldots, \lambda_N$;

N optical links $LE_1, \ldots, LE_N$ each capable of receiving an "add" carrier, said add carriers constituting an add multiplex MI and having arbitrary wavelengths referenced $\lambda''_1, \ldots, \lambda''_N$;

switch means S4 controlled by the control means MC, having N inlets respectively connected to the N optical links $LE_1, \ldots, LE_N$, and having N outlets; the switch means S4 establishing respective optical connections between some of its inlets and some of its outlets, each outlet being connected to a single inlet only, but each inlet being connectable to a plurality of outlets; said switch means S4 making it possible, in particular, to select I "add" carriers from the N carriers received over the links $LE_1, \ldots, LE_N$ of the add multiplex MI;

coupling means S2 equivalent to N coupling devices controlled by the control means MC and each having two inlets d and e and one outlet f; each inlet d being connected to an outlet b of the means S1, and each inlet e being connected to a respective one of the outlets from the switch means S4; the outlet f of each coupling device providing either a through carrier or else an add carrier;

conversion means CL having N inlets and N outlets; the conversion means CL serving to convert the respective wavelengths of the N carriers into N fixed wavelengths $\lambda'_1, \ldots, \lambda'_N$: the resulting wavelengths being a function only of the inlet to which the respective carrier is applied; the N inlets being respectively connected to the N f outlets of the coupling means S2; the N outlets of the means CL being suitable for providing N respective carriers having different wavelengths $\lambda'_1, \ldots, \lambda'_N$; the carriers actually provided being: T new carriers respectively modulated by the signals modulating the T through carriers, and I new carriers respectively modulated by the signals modulating the I add carriers;

means MS2 having N inlets respectively connected to the N outlets of the means CL for spectrally multiplexing the N carriers provided by the means CL, thus constituting an outgoing multiplex MS; and switch means R equivalent to N on/off switches, enabling the links $LE_1, \ldots, LE_N$ of the add multiplex MI to be respectively looped back over the links $LS_1, \ldots, LS_N$ of the drop multiplex MT under the control of the control means MC, each link being capable of being looped back independently of the others.

Each switch in the means S1 is controlled by the control means MC to pass a carrier applied to its inlet a through either to its outlet b, or to its outlet c, or else to both its outlets b and c simultaneously. A carrier of the incoming multiplex ME can thus be selected to become:

either a drop carrier;

or a through carrier;

or else both simultaneously.

The switch means so co-operate with the conversion means CL to allocate one of the fixed wavelengths $\lambda'_1, \ldots, \lambda'_N$ to each of the signals modulating the through carriers. The switch means S4 co-operate with the conversion means CL to allocate one of the fixed wavelengths $\lambda'_1, \ldots, \lambda'_N$ to each of the modulating signals carried by the add carriers. Any wavelength $\lambda'_j$ taken from the wavelengths $\lambda'_1, \ldots, \lambda'_N$ is put into correspondence either with a wavelength $\lambda_i$ selected from the wavelengths $\lambda_1, \ldots, \lambda_N$; or else with a wavelength $\lambda''_k$ selected from the wavelengths $\lambda''_1, \ldots, \lambda''_N$. Thus, the signal modulating any carrier of the outgoing multiplex MS can be selected from any of the signals modulating the carriers of the incoming multiplex ME, or from any of the signals modulating the carriers of the add multiplex MI.

The means S2 are controlled by the control means MC so as to pass on either a carrier that has passed through the means S1, or else by a carrier that has passed through the means S4. The choice of wavelengths $\lambda''_1, \ldots, \lambda''_N$ for the add carriers is thus independent from the choice of wavelengths $\lambda_1, \ldots, \lambda_N$ for the incoming carriers.

FIG. 3 is a block diagram of a first embodiment of a multiplexer of the invention. This embodiment comprises:

- control means MC1 receiving multiplexer configuration instructions by a conventional signalling method;
- an optical broadcaster D1 having one inlet receiving the incoming multiplex ME, and N outlets;
- N tunable optical filters $F_1^T, \ldots, F_N^T$ each having an inlet connected to a respective one of the outlets of the broadcaster D1, and a control input connected to the control means MC1 via links that are not shown;
- N optical switches $SW_1, \ldots, SW_N$, each having two inlets g and h and two outlets k and j, each inlet g being connected to a respective outlet of one of the filters $F_1^T, \ldots, F_N^T$; and having a control input connected to the control means MC1 via links that are not shown;
- N regenerators each constituted by an optical receiver and emitter $RX_1^T - TX_1^T, \ldots$, each receiver having an inlet connected to the outlet k of one of the switches $SW_1, \ldots, SW_N$, and having an outlet connected to the inlet of the corresponding optical emitter;
- an optical combiner C1 having N inlets each connected to the outlet of a respective one of the optical emitters $TX_1^T, \ldots, TX_N^T$, and having a single outlet that provides the outgoing multiplex MS;
- N optical emitters $TX_1^I, \ldots, TX_N^I$, each having an electrical input capable of receiving a modulating signal and having an outlet providing a carrier at a respective wavelength $\lambda''_1, \ldots, \lambda''_n$, the set of these N carriers being suitable for constituting an add multiplex MI;
- a combiner-broadcaster CD1 having N inlets connected to respective ones of the N outlets from the emitters $TX_1^I, \ldots, TX_N^I$, and having N outlets;
- N tunable filters $F_1^I, \ldots, F_N^I$ each having: an inlet connected to a respective outlet of the combiner-broadcaster CD1; a control input connected to the control means MC1 via a link that is not shown; and an outlet connected to an inlet h of a respective one of the optical switches $SW_1, \ldots, SW_N$; and
- N optical receivers $RX_1^E, \ldots, RX_N^E$, each having an inlet connected to an outlet j of a respective one of the optical switches $SW_1, \ldots, SW_N$, said outlet j being capable of providing one of the optical carriers constituting the drop multiplex MT; and each having an electrical output providing a signal which is the signal modulating the optical carrier received at the inlet of the receiver.

Each of the tunable filters $F_1^T, \ldots, F_N^T$ is tunable to one of the wavelengths $\lambda_1, \ldots, \lambda_N$ of the carriers constituting the incoming multiplex ME. Each of the tunable filters $F_1^I, \ldots, F_N^I$ is tunable to one of the wavelengths $\lambda''_1, \ldots, \lambda''_N$ of the carriers constituting the add multiplex MI. The emitters $TX_1^I, \ldots, TX_N^I$ emit respective wavelengths $\lambda''_1, \ldots, \lambda''_N$ which are fixed and which can be different from the wavelengths $\lambda_1, \ldots, \lambda_N$ and $\lambda'_1, \ldots, \lambda'_N$. The emitters $TX_1^T, \ldots, TX_N^T$ emit wavelengths $\lambda'_1, \ldots, \lambda'_N$ which are fixed and which are independent of the wavelengths $\lambda_1, \ldots, \lambda_N$ and $\lambda''_1, \ldots, \lambda''_N$.

Each of the optical switches $SW_1, \ldots, SW_N$ is controllable to establish the following sets of connections:

g-k and h-j for passing a carrier of the incoming multiplex ME through to the outgoing multiplex MS;

or g-k & g-j, and h-k & h-j, for passing through to the outgoing multiplex MS while simultaneously dropping the same carrier to the drop multiplex MT; the filters $F_1^I, \ldots, F_N^I$ being controlled under such circumstances so as to be tuned to a "rest" wavelength that is different from all of $\lambda''_1, \ldots, \lambda''_N$ so as to apply no optical signal to the inlet h;

or else g-j and h-k for dropping a carrier in the incoming multiplex ME to the drop multiplex MT, while simultaneously adding another add multiplex carrier MI to the outgoing multiplex MS.

The optical switches $SW_1, \ldots, SW_N$ may be constituted by PISW 15P type switches manufactured by the US firm Crystal Technology, or by PGS2010/5SS type switches manufactured by the Swedish firm Ericson.

Naturally other types of optical switch could be used in particular switches in which the optical connections established from the inlets g and h are independent In this first embodiment, the means DS2 for demultiplexing the carriers of the incoming multiplex ME are constituted by the broadcaster D1 and by the N tunable filters $F_1^T, \ldots, F_N^T$. The switching means S4 for allocating a wavelength selected from the wavelengths $\lambda'_1, \ldots, \lambda'_N$ to each of the modulating signals carried by the add multiplex MI are constituted by the combiner-broadcaster CD1 and the N tunable filters $F_1^I, \ldots, F_N^I$.

The switch means SO for allocating a wavelength selected from the wavelengths $\lambda'_1, \ldots, \lambda'_N$ to each of the signals modulating the through carriers are constituted by the tunable filters $F_1^T, \ldots, F_N^T$ since they select the appropriate one of the regenerators $RX_1^T, \ldots,$ or $RX_N^T$ for converting the wavelength of each through carrier In addition these filters select the appropriate ones of the links $LS_1, \ldots,$ or $LS_N$ on which each drop carrier leaves.

The selection means S1 for selecting T through carriers and E drop carriers from the N carriers of the incoming multiplex ME are constituted by the optical switches $SW_1, \ldots, SW_N$. These also constitute the switches R enabling the links $LE_1, \ldots, LE_1$ of the add multiplex MI to be selectively looped back to the links $LS_1, \ldots, LS_N$ of the drop multiplex MT. Finally, they also constitute the coupling means S2. They are active coupling means since they are controlled by the control means MC1 to convey the through carriers and the add carriers to the conversion means CL. In this first embodiment the conversion means are constituted by the N regenerators $RX_1^T - TX_1^T, \ldots, RX_N^T - TX_N^T$ which are common for the through carriers and for the add carriers Consider, by way of example, the case where the signal modulating the carrier of wavelength $\lambda_N$ in the incoming multiplex ME is required to modulate a new carrier having a wavelength $\lambda'_1$ in the outgoing multiplex MS. In this example, the wavelength $\lambda'_1$ is provided by the emitter $TX_1^T$. The control means MC1 control the filter $F_1^T$ to select the wavelength $\lambda_N$, and they control the switch $SW_1$ to establish the connection g-k in order to pass the carrier of wavelength $\lambda_N$ through to the receiver $RX_1^T$. If it is also necessary to drop the signal modulating the carrier of wavelength $\lambda_N$ so as to deliver it to the drop multiplex MT, then the control means MC1 also set up the connection g-j. The data then becomes available on the outlet of the receiver $RX_1^E$ in this example.

Now consider the case where the signal modulating a carrier of wavelength $\lambda''_i$ on link $LE_i$ in the add multiplex MI is to be added into the outgoing multiplex MS on an optical carrier of wavelength $\lambda'_m$, for example. The wavelength $\lambda'_m$ is emitted by an emitter $TX_m^T$. Consequently, the control means MC1 control a switch $SW_m$ to set up a connection h-k and they control a filter $F_m^I$ whose outlet is connected to the inlet h of the switch $SW_m$ so as to tune it on the wavelength $\lambda''_i$ of the carrier to be added. The choice of wavelength $\lambda'_m$ depends on availability amongst the wavelengths $\lambda'_1, \ldots, \lambda'_N$. The number I of carriers added into the outgoing multiplex MS is always less than or equal to the number N-T. The number T may be greater than N-E because some carriers may be both through carriers and drop carriers.

The switches $SW_1, \ldots, SW_N$ also make it possible to loop an arbitrary carrier of the add multiplex MI back to an arbitrary carrier of the drop multiplex MT. Assume that looping back is to be done on a given link. The chosen link determines which one of the switches $SW_1, \ldots, SW_N$ is to be chosen. Two situations then need to be distinguished, depending on whether that particular switch also needs to convey a through carrier or an add carrier.

If the switch $SW_1$ sets up the connection g-k, it necessarily also sets up the connection h-j. To loop an arbitrary link $LE_p$ of the add multiplex MI back on the link $LS_1$ of the drop multiplex MT, for example the control means MC1 tune the filter $F_1^I$ whose outlet is connected to the input h of the switch $SW_1$ to the wavelength $\lambda''_p$. However when such looping back is not desired then the filter must be tuned to a "rest" wavelength that is different from any of $\lambda''_1, \ldots, \lambda''_N$.

If the switch $SW_1$ sets up the connection h-k to add a carrier applied on the link $LE_i$, for example it can also simultaneously set up a connection h-j to loop the link $LE_i$ back on the link $LS_1$. In which case the choice of link LS in the drop multiplex is not free and is constrained by the choice of new wavelength for allocation to the signal modulating the add carrier To avoid any collision between a signal modulating a through carrier and a signal modulating an add carrier the control means MC1 control the filters $F_1^T, \ldots, F_N^T$, and $F_1^I, \ldots, F_N^I$, and the switches $SW_1, \ldots, SW_N$, so as to prevent two carriers being passed through simultaneously to a single regenerator $RX_1^T$-$TX_1^T, \ldots, RX_N^T$-$TX_N^T$ or to a single receiver $RX_1^E, \ldots, RX_N^E$.

FIG. 4 is a block diagram of a second embodiment of the multiplexer of the invention. The incoming multiplex ME is applied to an optical broadcaster D2 that possess 2N outlets. Outlets numbered 1 to N are connected to respective inlets of N tunable filters $F_1^T, \ldots, F_N^T$, while outlets numbered N+1 to 2N are connected to respective inlets of N additional tunable filters $F_1^E, \ldots, F_N^E$. The outlets from these filters provide the drop multiplex MT. These filters are controlled by signals supplied by the control means MC2.

In this second embodiment the demultiplexing means DS2 are constituted by the broadcaster D2, by the N tunable filters $F_1^T, \ldots, F_N^T$ for selecting T through carriers and by the N tunable filters $F_1^E, \ldots, F_N^E$ for selecting E drop carriers The switch means S0 are constituted by the same filters $F_1^T, \ldots, F_N^T$ and $F_1^E, \ldots, F_N^E$.

The selection means S1 are constituted by the N tunable filters $F_1^E, \ldots, F_N^E$ for selecting the E drop carriers and by the N tunable filters $F_1^T, \ldots, F_N^T$ for selecting the T through carriers that are passed through to the outgoing multiplex MS. As in the first embodiment the filters $F_1^T, \ldots, F_N^T$ establish correspondence between the wavelengths of the T through carriers selected from $\lambda_1, \ldots, \lambda_N$ and the wavelengths of the T new carriers selected from $\lambda'_1, \ldots, \lambda'_N$, and they enable this correspondence relationship to be reconfigured. The coupling means S2 are constituted by the tunable filters $F_1^T, \ldots, F_N^T$ and by tunable filters $F_1^I, \ldots, F_N^I$, and also by N passive couplers $CP_1, \ldots, CP_N$.

The optical switches $SW_1, \ldots, SW_N$ are omitted and are replaced by the N passive couplers $CP_1, \ldots, CP_N$, each having two inlets and one outlet:

one inlet is connected to the outlet of a respective one of the tunable filters $F_1^T, \ldots, F_N^T$;

the other inlet is connected to the outlet of a respective one of the tunable filters $F_1^I, \ldots, F_N^I$ which perform the same functions as the filters $F_1^I, \ldots, F_N^I$ the first embodiment; and the outlet is connected to the inlet of a respective one of receivers $RX_1^T, \ldots, RX_N^T$ which perform the same functions as the receivers $RX_1^T, \ldots, RX_N^T$ in the first embodiment.

The switch means S4 are constituted by the combiner CD2 and the tunable filters $F_1^T, \ldots, F_N^T$.

In this second embodiment there are no switching means R enabling the links $LE_1, \ldots, LE_N$ of the add multiplex MI to be looped back on the links $LS_1, \ldots, LS_N$ of the drop multiplex MT.

The other components of this second embodiment are analogous to those of the first embodiment described above The control means MC2 tune E of the filters $F_1^E, \ldots, F_N^E$ to the E wavelengths of the carriers that are to be dropped Which particular filter is chosen to drop a given carrier is a function of the link LS of the drop multiplex MT onto which the signal modulating said carrier is to be applied The control means MC2 also tune T of the filters $F_1^T, \ldots, F_N^T$ to the T respective wavelengths of the modulating signals that are to be applied to the outgoing multiplex MS.

It is quite possible to select the same carrier to constitute both a drop carrier and a through carrier simultaneously. Those of the filters $F_1^T, \ldots, F_N^T$ which are not used are tuned to a "rest" wavelength which is different from all of the wavelengths $\lambda_1, \ldots, \lambda_N$ of the incoming multiplex ME. The control means MC2 also tune I of the filters $F_1^I, \ldots, F_N^I$ to I wavelengths selected from the wavelengths $\lambda''_1, \ldots, \lambda''_N$ of the add multiplex MI so that these filters pass through I carriers whose modulating signals are to be added to the outgoing multiplex MS. In the filters $F_1^I, \ldots, F_N^I$, those that are not used are tuned to a rest wavelength different from $\lambda''_1, \ldots, \lambda''_N$.

To avoid any collision between a signal modulating a through carrier and a signal modulating an add carrier the control means MC2 control the filters $F_1^T, \ldots, F_N^T$ and $F_1^I, \ldots, F_N^I$ in such a manner as to prevent two carriers being passed through simultaneously to the same regenerator $RX_1^T$-$TX_1^T, \ldots, RX_N^T$-$TX_N^T$.

By way of example consider dropping the signal modulating a carrier of wavelength $\lambda_1$ in the incoming multiplex ME and putting it on link $LS_4$ of the drop multiplex MT, while simultaneously adding the signal modulating a carrier of wavelength $\lambda''_2$ in the add multiplex MI and applying it to a carrier of wavelength $\lambda'_5$ in the outgoing multiplex MS. The control means MC2 tune the filter $F_4^E$ to the wavelength $\lambda_1$ of the carrier that is to be dropped The filter $F_5^I$ is tuned to the wavelength $\lambda''_2$. The passive coupler CP5 conveys the carrier of wavelength $\lambda''_2$ to the regenerator $RX_5^T$-$TX_5^T$ which emits on the wavelength $\lambda'_5$.

FIG. 5 is a block diagram of a third embodiment. This embodiment differs from the second solely in that the coupling means S2 and the conversion means CL are implemented differently The other means are analogous to those of the second embodiment. This third embodiment does not include means R enabling the links $LE_1, \ldots, LE_N$ to be looped back selectively onto the links $LS_1, \ldots, LS_N$.

The passive couplers $CP_1, \ldots, CP_N$ are omitted and replaced by direct links between the outlets of N tunable filters $F_1^T, \ldots, F_N^T$ selecting T through carriers and the inlets of N regenerators $RX_1^{T'}$-$TX_1^{T'}, \ldots, RX_N^{T'}$-$TX_N^{T'}$. Carriers are added by means of a combiner C3 having 2N inlets, instead of the combiner C2 which has only N inlets. The inlets of the combiner C3 that are numbered 1 to N are connected to respective outlets of the N regenerators $RX_1^{T"}$–$TX_1^{T"}$, ..., $RX_N^{T"}$–$TX_N^{T"}$, while the inlets numbered N+1 to 2N are connected to respective outlets of N additional regenerators $RX_1^{T}$–$TX_1^{T}$, ..., $RX_N^{T}$–$TX_N^{T}$. Each of these additional regenerators has an inlet connected to the outlet of a respective tunable filter $F_1^{T"}$, ..., $F_N^{T"}$, which filters perform the same functions as the filters $F_1^{T}$, ..., $F_N^{T}$ in the second embodiment In this example the switch means S2 are thus constituted by the tunable filters $F_1^{T"}$, ..., $F_N^{T"}$ and $F_1^{T"}$, ..., $F_N^{T"}$.

Control means MC2' perform the same functions as the control means MC2 in the second embodiment To prevent any collision between a signal modulating a through carrier and a signal modulating an add carrier the control means MC2' control the filters so as to avoid a filter $F_i^{T"}$ selecting a carrier if the filter $F_i^{T"}$ has already selected a carrier and vice versa.

The emitters $TX_1^I$, ..., $TX_N^I$ are tuned on respective wavelengths $\lambda'_1$, ..., $\lambda'_N$, as are the emitters $TX_1^{T"}$, ..., $TX_N^{T"}$. Instead of tuning some of the filters $F_1^{T"}$, ..., or $F_1^{T"}$, ..., $F_N^{T"}$, as the case may be, to a "rest" wavelength, it is possible to switch off the corresponding regenerators $RX_1^{T"}$–$TX_1^{T"}$, ..., $RX_N^{T"}$–$TX_N^{T"}$; $RX_1^I$–$TX_1^I$, ..., $RX_N^I$–$TX_N^I$.

The scope of the invention is not limited to the case where the number of incoming links and the number of outgoing links are both equal to N. One or other or both of these numbers could be less than N in certain applications.

Furthermore, the wavelength conversion means may be constituted by optical-optical type converters instead of being regenerators.

The fact that the filters $F_1^T$, ..., $F_N^T$ and the analogous filters in the other embodiments are tunable provides the advantage of enabling the multiplexer to be protected against failure of one of the components of the multiplexer. Under such circumstances, the control means can perform rerouting internally to the multiplexer so as to avoid causing one of the carriers to pass via the faulty component. Naturally the total through capacity of the multiplexer is then reduced to N−1 carriers, but there is no loss of information so long as the amount of data to be conveyed does not exceed the capacity of the remaining N−1 carriers.

A simple modification of the three above-described embodiments makes it possible to protect a network against failure of a multiplexer It suffices to provide an optical gate that is connected in parallel with a multiplexer said gate being switched off so long as the multiplexer is operating normally, and being switched on when the multiplexer is faulty. The gate may short circuit the incoming multiplex ME to the outgoing multiplex MS, or in an alternative embodiment, it may connect an additional outlet of the incoming broadcaster, D1, D2, D2" as the case may be to an additional inlet of the corresponding outgoing combiner C1, C2, or C3.

To protect a network against line failure, it is known that the network can be given the configuration of a duplicated ring.

FIG. 6 illustrates that known method of protecting against failure of a transmission line. In this example, four add-drop multiplexers A, B, C, and D are connected in a network by a "normal" ring AN1, AN2, AN3, and AN4; and by a "back-up" ring AS1, AS2, AS3, and AS4. In this example, the segments AN2 and AS2 are interrupted by some breakdown or accident. Data that would normally circulate around the ring AN1, AN2, AN3, and AN4 now circulates around a folded ring constituted by the segments AN1, AS1, AS4, AS3, AN3, and AN4 because of two looping-back operations performed respectively in the multiplexer D and in the multiplexer C, these two multiplexers bracketing the segments AN2 and AS2 in which the line fault is located. Service is thus maintained after a short interruption that is required for setting up the looped-back configuration.

FIG. 7 shows a portion of a block diagram for the multiplexers D and C to show the additional components that are used for looping back. The two rings may optionally include amplifiers that are not shown.

The multiplexer D comprises:

an optical divider D4 having an inlet connected to segment AN1 of the normal ring;

a combiner C4 having an outlet connected to segment AN2 of the normal ring, which segment is interrupted in the present example;

an optical switch I1 having three accesses a, b, and c, and a control input which is connected to the control means of the multiplexer D, said control means not being shown; and an optical switch I2 having three accesses d, e, and f, together with a control input connected to the control means of the multiplexer D (not shown).

Losses caused by the combiners and the diffusers remain unchanged relative to the normal ring. The energy budget of the link is therefore unchanged compared with the normal ring. The multiplexer of the invention thus has the advantage of being entirely compatible with the above known method of protection.

The switch I1 acts as a changeover switch enabling one or other of the following optical connections to be established: a-c, b-c. Similarly, the switch I2 acts as a changeover switch enabling one of the following optical connections to be established: d-e, or d-f. Access a is connected to an inlet of divider D4. Access b is connected to segment AS1 of the back-up ring. Access c is connected to access d of switch I2. Access e is connected to an outlet of the combiner C4. Access f is connected to segment AS2 of the back-up ring.

The multiplexer C has corresponding components: a divider D5, a combiner C5, and two optical switches I3 and I4. Access b of switch I3 is connected to segment AS2 which is interrupted. Access f of switch I4 is connected to segment AS3. An inlet of divider D5 is connected to segment AN2 which is interrupted. An outlet of combiner C5 is connected to segment AN3.

So long as there is no failure of the transmission line, optical switch I1 and all corresponding switches set up the connection b-c; optical switch I2 and all corresponding switches set up connection d-f. The segments AS1, AS2, AS3, and AS4 thus constitute a closed ring over which no data travels. The segments AN1, AN2, AN3, and AN4 constitute a closed ring over which the data travels.

In the event of a line fault between multiplexers D and C, as shown in FIG. 7, the control means of multiplexer D cause switch I1 to maintain connection b-c and cause switch I2 to establish connection d-e instead of d-f. In this way the outgoing multiplex from combiner C4 which can no longer be conveyed by segment AN2 is rerouted to segment AS1 via the switches I1 and I2.

Symmetrically, the control means of multiplexer C cause switch I3 to set up connection a-c instead of b-c, while ensuring that switch I4 maintains its connection d-f.

We claim:

1. An add-drop optical spectrum-division multiplexer for dropping a drop multiplex from an incoming multiplex, and for adding an add multiplex to an outgoing multiplex, the multiplexer comprising:

spectrum-division demultiplexing means for separating N number of carriers from the incoming multiplex, said incoming multiplex having no more than N number of carriers;

spectrum-division multiplexing means for multiplexing N number of carriers, thereby constituting an outgoing multiplex; and coupling means for coupling the demultiplexing means to the multiplexing means;

the spectrum-division demultiplexing means and the coupling means comprise:

an optical broadcaster for receiving the incoming multiplex and reproducing said incoming multiplex on at least N number of outlets;

at least N number of tunable filters coupled respectively to the N number of outlets of the broadcaster to select T number of through carriers from the incoming multiplex, where the number T is variable and not greater than N;

selection means for selecting, amongst no more than N number of demultiplexed carriers, E number of carriers and constituting the drop multiplex, the number E being variable and not greater than N;

selection means for selecting, from amongst the carriers constituting the add multiplex, I number of add carriers, the number I being variable and not greater than N;

means for supplying the multiplexing means with T number of new carriers having T number of respective different wavelengths selectable from N number of fixed wavelengths, and being respectively modulated by the signals modulating the T number of through carriers; and means for supplying the multiplexing means with I number of new optical carriers having I number of respective different wavelengths selectable from the N number of fixed wavelengths and different from the T number of wavelengths selected for the signals modulating the T number of through carriers, said I number of new wavelengths being modulated by the signals modulating the I number of add carriers.

2. A multiplexer according to claim 1, wherein the means for selecting E number of drop carriers comprises means for enabling each of the carriers of the incoming multiplex to be directed simultaneously to the drop multiplex and to the means for supplying T number of new optical carriers.

3. A multiplexer according to claim 1, further comprising switch means for enabling any carrier in the add multiplex to be selected and passed through to the outgoing multiplex.

4. A multiplexer according to claim 1, wherein the means for supplying T number of new optical carriers to the multiplexing means, and the means for providing I number of new optical carriers to the multiplexing means comprise:

common conversion means for converting no more than N number of wavelengths; and common coupling means for coupling the selection means for selecting T number of through carriers to said conversion means, and the selection means for selecting I number of add carriers;

in that the selection means for selecting I number of add carriers selects the add carriers and transmits them to the common conversion means so as to allocate one of the fixed wavelengths to each of the signals modulating the add carriers; and in that the N filters for selecting T number of through carriers selects demultiplexed carriers and transmits them to the common conversion means so as to allocate one of the fixed wavelengths to each of the signals modulating the through carriers.

5. A multiplexer according to claim 4, wherein the common coupling means comprises N number of optical switches each having two inlets and two outlets, a first outlet of each switch being connected to an inlet of the conversion means, and a second outlet being connected to the drop multiplex.

6. A multiplexer according to claim 4, wherein the common coupling means comprise N passive couplers each having two inlets and one outlet; the two inlets being connected respectively to one outlet of the selection means for selecting T number of through carriers, and to one outlet of the selection means for selecting I number of add carriers.

7. A multiplexer according to claim 1, wherein the means for supplying T number of new carriers to the multiplexing means comprise:

first conversion means for converting the respective wavelengths of not more than N number of through carriers to the fixed wavelengths and having inlets directly connected to the outlets of N number of filters for selecting T number of through carriers; and switch means co-operating with the first conversion means to allocate one of the fixed wavelengths to each of the signals modulating the through carriers; and the means for supplying I number of new optical carriers to the multiplexing means comprise:

second conversion means that are distinct from the first conversion means, for converting the respective wavelengths of not more than N number of add carriers to the fixed wavelengths, having inlets connected directly to the outlets of the selection means for selecting I number of add carriers; and switch means co-operating with the second conversion means to allocate one of the fixed wavelengths to each of the modulating signals carried by the add carriers.

8. An add-drop optical spectrum-division multiplexer for dropping a drop multiplex from an incoming multiplex, and for adding an add multiplex to an outgoing multiplex, the multiplexer comprising:

spectrum-division demultiplexing means for separating N number of carriers from the incoming multiplex, said incoming multiplex having no more than N number of carriers;

spectrum-division multiplexing means for multiplexing N number of carriers, thereby constituting an outgoing multiplex; and coupling means for coupling the demultiplexing means to the multiplexing means;

the spectrum-division demultiplexing means and the coupling means comprise:

an optical broadcaster which receives the incoming multiplex and reproducing the incoming multiplex on at least N number of outlets;

a first set of N tunable filters coupled to respective ones of the N number of outlets from the broadcaster to select, in the incoming multiplex, E number of drop carriers and T number of through carriers where the numbers T and E are variable and not greater than N;

a second set of N number of tunable filters for selecting, for the carriers constituting the add multiplex, I number of add carriers, the number I being variable and not greater than N;

N number of wavelength converters for providing the multiplexing means with T number of new carriers respectively modulated by the signals modulating the T number of through carriers, and I number of new optical carriers modulated by the signals modulating the I number of add carriers, said N number of new carriers having N number of different wavelengths; and N number of optical switches each having two inlets and two outlets, and each having:
  a first inlet connected to an outlet of a respective filter of the first set;
  a second inlet connected to an outlet of a respective filter of the second set;
  a first outlet connected to the inlet of a respective one of the wavelength converters; and
  a second outlet providing a drop carrier to the drop multiplex;
  and in that the multiplexing means includes an N-inlet optical combiner having its inlets connected to the outlets of respective ones of the N number of wavelength converters.

9. An add-drop optical spectrum-division multiplexer for dropping a drop multiplex from an incoming multiplex, and for adding an add multiplex to an outgoing multiplex, the multiplexer comprising:

spectrum-division demultiplexing means for separating N number of carriers from the incoming multiplex, said incoming multiplex having no more than N number of carriers;

spectrum-division multiplexing means for multiplexing N number of carriers, thereby constituting an outgoing multiplex; and coupling means for coupling the demultiplexing means to the multiplexing means;

the spectrum-division demultiplexing means and the coupling means comprise:
  an optical broadcaster for receiving the incoming multiplex and reproducing said incoming multiplex on N number of outlets;
  a first set of N number of tunable filters coupled to the N number of respective outlets of the broadcaster to select, from the incoming multiplex, E number of drop carriers;
  a second set of N number of tunable filters coupled to the N number of respective outlets of the broadcaster to select from the incoming multiplex T number of through carriers;
  a third set of N number of tunable filter for selecting, from the carriers constituting the add multiplex I number of add carriers, the number I being variable and not greater than N;
  N number of passive couplers each having two inlets and one outlet, the two inlets being respectively connected to the outlet of a filter in the second set and to the outlet in the of a filter in the third set; and N number of wavelength converters for providing the multiplexing means with T+I number of new carriers respectively modulated by the signals modulating the T number of through carriers and the I number of add carriers, where the sum T+I is not greater than N; and the multiplexing means include an N inlet optical combiner whose N number of inlets are connected to respective outlets from the N number of wavelength converters.

10. An add-drop optical spectrum-division multiplexer for dropping a drop multiplex from an incoming multiplex, and for adding an add multiplex to an outgoing multiplex, the multiplexer comprising:

spectrum-division demultiplexing means for separating N number of carriers from the incoming multiplex, said incoming multiplex having no more than N number of carriers;

spectrum-division multiplexing means for multiplexing N number of carriers, thereby constituting an outgoing multiplex; and coupling means for coupling the demultiplexing means to the multiplexing means;

the spectrum-division demultiplexing means and the coupling means comprise:
  an optical broadcaster for receiving the incoming multiplex and reproducing said incoming multiplex on N number of outlets;
  a first set of N number of tunable filters coupled to respective ones of the N number of outlets of the broadcaster to select E number of drop carriers from the incoming multiplex, and for selecting T number of through carriers therefrom, the numbers T and E being variable and not greater than N;
  a second set of N number of tunable filters coupled to respective ones of the N number of outlets of the broadcaster to select T number of through carriers from the incoming multiplex;
  a third set of N number of tunable filters for selecting, from the carriers constituting the add multiplex, I number of add carriers, where the number I is variable and not greater than N;
  N number of wavelength converters each having one inlet connected to an outlet from a respective filter of the first set, to provide the multiplexing means with T number of new carriers respectively modulated by the signals modulating the N number of through carriers; and
  N number of wavelength converters for providing the multiplexing means with I number of new carriers respectively modulated by the signals modulating the I number of carriers to be inserted; and
  the multiplexing means comprise an optical combiner having 2N number of inlets connected to respective outlets of the 2N number of wavelength converters.

* * * * *